United States Patent [19]
Geltinger et al.

[11] Patent Number: 5,895,611
[45] Date of Patent: Apr. 20, 1999

[54] PROCESS FOR PRODUCING INTERIOR TRIMS FOR TRANSPORT MEANS AND INTERIOR TRIMS PRODUCED IN THIS PROCESS

[75] Inventors: Hubert Geltinger, Vilsbiburg; Markus Reichard, Geisenhausen, both of Germany

[73] Assignee: Eldra Kunststofftechnik GmbH, Vilsbiburg, Germany

[21] Appl. No.: 08/615,314

[22] PCT Filed: Jul. 19, 1995

[86] PCT No.: PCT/EP95/02843

§ 371 Date: Jan. 6, 1997

§ 102(e) Date: Jan. 6, 1997

[87] PCT Pub. No.: WO96/02589

PCT Pub. Date: Feb. 1, 1996

[30] Foreign Application Priority Data

Jul. 19, 1994 [DE] Germany ................ 44 25 447
Aug. 18, 1994 [DE] Germany ................ 44 29 355

[51] Int. Cl.$^6$ ............... B29C 33/48; B60R 13/00
[52] U.S. Cl. ....................... 264/45.3; 428/31
[58] Field of Search ............ 428/31, 74; 264/45.3, 264/45.4, 45.5

[56] References Cited

U.S. PATENT DOCUMENTS 4,983,442  1/1991  Patel et al. .................. 428/74
5,580,501  12/1996 Gallagher et al. .............. 264/45.3

FOREIGN PATENT DOCUMENTS

| | | |
|---|---|---|
| 0320042 | 6/1989 | European Pat. Off. . |
| 0518338 | 6/1992 | European Pat. Off. . |
| 2683763 | 5/1993 | France . |
| 805708 | 5/1951 | Germany . |
| 1808349 | 5/1970 | Germany . |
| 3521828 | 1/1987 | Germany . |
| 5142630 | 7/1980 | Japan . |
| 3272836 | 4/1992 | Japan . |
| 1206593 | 9/1970 | United Kingdom . |

*Primary Examiner*—Eggerton A. Campbell
*Attorney, Agent, or Firm*—Sughrue, Mion, Zinn, Macpeak & Seas, PLLC

[57] ABSTRACT

A process is disclosed for producing interior trims for transport means, in particular motor vehicles, that consist of a bearing dimensionally stable part and of a decorative part that forms the visible side of the interior trim. The bearing, dimensionally stable part is made of plastic materials stiffened by reinforcing inserts. In order to considerably improve the process, the plastic materials consist of natural or recycled polyols and isocyanates and a material made of natural fibers is used for the reinforcing inserts. The material made of natural fibres is laid into a heatable (foaming) mold whose shape corresponds to that of the interior trim to be produced, the reactive, foamable polyurethane mixture is injected into the mold at a dosing pressure from 100 to 300 bars, then foamed and hardened in the mold at a reaction pressure form 3 to 300 bars.

12 Claims, No Drawings

PROCESS FOR PRODUCING INTERIOR TRIMS FOR TRANSPORT MEANS AND INTERIOR TRIMS PRODUCED IN THIS PROCESS

The invention relates to a process for producing interior trims for transport means, in particular motor vehicles, which consist of a bearing, dimensionally stable part and a decorative part that forms the visible side of the interior trim, the bearing, dimensionally stable part being made of plastic material strengthened by reinforcing inserts.

Interior trims of transport means, in particular motor vehicles, i.e. apart from parts hardly or never in contact with the user or load of the transport means, for example the inside roof lining, must as a rule have a certain minimum resistance against mechanical loads, i.e. for example a certain bending and tensile strength. Simultaneously, however, a certain dimensional stability with respect to natural influences such as temperature and temperature change, for example a specific thermo-longitudinal expansion within specified limits, or a limited moisture absorption and the like is of greater necessity. In addition to fulfilling such mechanical strength requirements, demands are placed in the design of interior trims for transport means, in particular motor vehicles, but also in a lowest possible weight and the direct securing of or direct connection with the decorative materials forming the visible side of the interior trims, such as foils consisting of ABS, ASA, TPO, PVC, PE, PP or PUR or natural decorative materials such as leather, textile fabrics, velour or carpet. Finally, interior trims of motor vehicles should have a minimum degree of sound-absorbing properties and additionally also be producable with the smallest possible effort in a recycling-friendly manner. In order to fulfil the largest possible number of these requirements placed on interior trims, in particular in motor vehicles, these have been produced up to now from a carrier plate consisting of a commonly available and foamed PUR mixture and a decorative material, connected or adhered to this, in such a manner that the decorative material is initially laid in the foam form and the foamable PUR mixture consisting of commonly available material is subsequently inlaid, it being necessary in view of the reaction pressures occurring during foaming to at least cover the seam points of the decorative material with a special foil in order to prevent a penetration of the foam to the visible side of the interior trim. In so far as it was also necessary for strength reasons to particularly reinforce the carrier plate, materials known and proven as filling or reinforcing material, such as mineral or plastic fibers, were used, these mineral or plastic fibers being placed into the foam form mostly in the form of a fleece, but sometimes also in the form of strands, before the foamable material is inlaid.

On the one hand, the use of plastic or mineral fibers and even the use of mineral material as a filling material or a reinforcing material is associated with a lot of effort and, on the other hand, not very friendly in terms of recycling or waste disposal and, finally, is also associated with a very high proportion of the weight. In particular, the use of a reinforcing material consisting of a mineral fiber material results on the one hand in a detriment of the working area, in particular of the health of the workers concerned with the production of the interior trims and, on the other hand, for example in the case of incineration of waste, leads to an increased occurrence of undesirable slag which can not be utilized. It must also be especially taken into account here that a certain amount of heating material is required in waste incineration which up to now had to be provided by the addition of mineral oil or heating oil.

The invention is therefore based on the object of providing a process for producing interior trim for transport means, in particular motor vehicles, which, on the one hand, permits the fulfilment of all mechanical strength requirements and the temperature independence requirements placed on an interior trim, but, on the other hand, also provides a reduction in the production costs with a simultaneous improvement in recycling friendliness and the lowest possible total weight. An essential part of this object also consists on the one hand in improving the working conditions for the workers concerned with the production of the interior trims and, on the other hand, in improving the recycling conditions or even the waste disposal conditions, in particular waste incineration.

This object is solved according to the invention essentially in that for the production of interior trims, a mixture consisting of natural polyols, in particular of the vegetable type, or of recycled polyols and isocyanates or a preparation of polyether or polyester-polyols and polyvalent aromatic or aliphatic isocyanates and, in connection with this, a material consisting of natural fibers as a reinforcing insert are used.

The use of a natural fiber material as a reinforcing material or filling substance for an interior trim for transport means, in particular motor vehicles, to be produced from natural or recycled polyols as well as a portion of the mixture consisting of isocyanates and a portion of plastics makes possible regardless of achieving the required mechanical and thermal properties of the interior trim, on the one hand, a reduction in the manufacturing input because substantially recycled material can be used with this and, on the other hand, a considerable reduction in weight of the interior trim. In addition to these advantages, the effect is also added that the reinforcing material or filling material consisting of natural fiber material leads in an optimal manner to a solution of the problems sufficient in respect of all arising requirements with respect to temperature resistance or limited heat transfer of the interior trim. A very particular advantage of using natural fiber materials is also to be seen in that the burden on the health of the workers associated with the use, for example, of glass fibers is removed. Furthermore, a decisive improvement in waste disposal, especially waste incineration, is achieved in that interior trims produced in accordance with the inventive process can not only be incinerated practically without producing harmful substances, but it can also serve as a heating material in the waste incineration and therefore renders the previously required additional use of mineral oil or heating oil superfluous.

It is self-evident that the use of a commonly available PUR mixture is possible within the scope of the invention if natural or recycled polyols are not available in sufficient quantities, for example on account of insufficient recycling capacities.

In carrying out the process according to the invention, it is provided for that material consisting of natural fibers is inlaid in a heatable (foam) form appropriately shaped with the spatial form of the interior trim to be produced and, subsequently a reactive, formable mixture consisting of natural or recycled polyols and isocyanates or of a preparation consisting of polyether and/or polyester polyols and polyvalent aromatic or aliphatic isocyanates is mixed at a dosing pressure of 100 to 300 bar and then inlaid in the (foam) form and foamed and hardened in the (foam) form at a reaction pressure of between 3 and 300 bar, the ratio of the reinforcing insert to the polyol and isocyanate mixture or to the preparation of polyether and/or polyester polyols and polyvalent aromatic or aliphatic isocyanates usefully lying in a range of 10 to 90% to 90 to 10% and the mixing ratio of natural or recycled polyols with respect to isocyanates also lies in a ratio range of 100:40 to 100:200.

Advantageously, the material of the reinforcing insert consisting of natural fiber material is subjected to a drying process in a process step preceding the inlaying into the foam form, the drying process being carried out either directly before placement in the foam form or measures are adopted which exclude a new absorption of water by the reinforcing material after the drying process.

As a complete or partial replacement for new material, recycled material can also be used for the reinforcing insert, such as old paper, used and cleaned textile material and the like reduced in size in the appropriate manner.

Jute, flax, coconut, banana, cotton wool, sisal, hanf or ramie fibers as well as straw can preferably be used as natural long-fiber material for the reinforcing insert, and this natural, long-fiber material or a natural, long-fiber material in general can be extracted from recycled textile fabric shreds or the like.

Paper scraps which are preferably obtained from old paper or industrial paper waste can be used as natural, short-fiber material for the reinforcing insert.

Additionally, the process according to the invention opens to the user a wide-ranging freedom of design or adaptation to predetermined requirements relating to the mechanical or thermal properties of an inner trim to be produced. This not only includes the possibility of being able to vary the ratio of reinforcing or filling material to the PUR mixture within a limit of 90 to 10% but, in connection with this, also a number of possibilities for arranging the reinforcing insert within the interior trim. Thus, it can be provided for in a first embodiment that material consisting of natural fibers, in particular scraps or long fibers which form the reinforcing insert, is laid in an unaligned, irregular, formed or performed manner in the (foam) form.

However, according to another embodiment of the process of the invention, it can also be provided for that the material consisting of natural fibers forming the reinforcing insert is laid in the (foam) form in a partially aligned manner, for example as fleece, cloth or textile fabric.

Furthermore, according to a particular embodiment of the inventive process, it can also be provided for that the material consisting of natural fibers and forming the reinforcing insert is laid into the (foam) form layer by layer in a superimposed and alternating manner in the form of irregular reinforcing inserts and aligned reinforcing inserts.

Regardless of the application of one of the above-mentioned modes of procedure, for the manufacture of an interior trim optimally adapted to a special application, it can also be provided for that, in addition to a reinforcing insert consisting of irregularly placed, natural, relatively short-fiber material aligned in the main loading direction of the interior trim, a wheel reinforcing insert consisting of aligned, long-fiber material can be placed in the (foam) form.

In order to produce an interior trim in one process step ready for use, in the case that the visible side of the interior trim is to be formed by a plastic foil, it is suggested to inlay a decorative material forming the visible side of the interior trim and consisting of ABS, ASA, TPO, PVC, PE, PP or PUR, before inlaying the reinforcing insert.

In the case that a cover of natural material is intended for the visible side of the interior trim, it is suggested that a decorative material consisting of leather, textile fabric, velour or carpet and forming the visible side of the interior trim is inlaid before placement of the reinforcing insert.

An interior trim for transport means, in particular motor vehicles, produced in the process described above and which consists of a bearing, dimensionally stable part and a decorative part that forms the visible side of the interior trim, the bearing, dimensionally stable part consisting of a plastic material stiffened by means of reinforcing inserts, is essentially characterized in that its bearing part consists of foamed plastic material of natural or recycled polyoles and isocyanates or of a preparation of polyether and/or polyesterpolyols and polyvalent aromatic or aliphatic isocyanates and of a reinforcing insert consisting of natural fibers, the portion of reinforcing material lying between 10% and 90%.

Further, such an inner trim is characterized in a first embodiment in that the reinforcing insert of the bearing part consists of jute, flax, coconut, banana, cotton wool, sisal, hanf of ramie fibers as well as straw. In a second embodiment, the interior trim is characterized in that the reinforcing insert of the bearing part consists of paper scraps.

Further characterizing features of an interior trim according to the invention result from the previously described uses of the material.

We claim:

1. A process for producing interior trims for transport means, in particular motor vehicles, comprising
   a bearing, dimensionally stable part and
   a decorative part that forms the visible side of the interior trim;
   the bearing, dimensionally stable part consisting of plastic material which is
   a preparation of polyether and/or polyester polyols and polyvalent aromatic or aliphatic isocyanates or a mixture consisting of natural or recycled polyols and isocyanates,
   strengthened by reinforcing inserts, consisting of natural fibers, wherein the natural fibers for the reinforcing inserts are short-fiber paper scraps, the paper scraps being laid in an unaligned, irregular formed or preformed manner into a form.

2. A process according to claim 1, wherein reinforcing inserts in a heatable form appropriately designed with the spatial shape of the interior trim to be produced are laid and, subsequently, a reactive, foamable mixture consisting of natural or recycled polyols and isocyanates or a preparation of polyether and/or polyester polyols and polyvalent aromatic or aliphatic isocyanates is mixed at a dosing pressure of 100 to 300 bar and laid in the form and foamed and hardened in the form at a reaction pressure of between 3 and 300 bar.

3. A process according to claim 1, wherein the mixing ratio between plastic material and the reinforcing insert lies in a range of 10 to 90% to 90 to 10%.

4. A process according to claim 1, wherein the mixing ratio of natural or recycled polyols to isocyanates or of polyether and/or polyesterpolyols lies in a ratio range of 100:40 to 100:200.

5. A process according to claim 1, wherein the material of the reinforcing insert consisting of natural fibers is dried in a process step preceding the laying in the form.

6. A process according to claim 1, wherein additionally to a reinforcing insert consisting of irregularly laid paper scraps, a reinforcing insert consisting of aligned, long-fiber fibrous material is laid into the form aligned in the main loading direction of the interior trim.

7. A process according to claim 1, wherein a decorative material forming the visible side of the interior trim and consisting of ABS, ASA, TPO, PVC, PE, PP or PUR is laid in advance of the laying of the reinforcing insert.

8. A process according to claim 1, wherein a decorative material forming the visible side of the interior trim and consisting of leather, textile fabric, velour or carpet is laid in advance of laying of the reinforcing insert.

9. A process according to claim 6, wherein jute, flax, coconut, banana, cotton wool, sisal, hanf or ramie fibers as well as straw are used as the natural, long-fiber material for the additional reinforcing insert.

10. A process according to claim 1, wherein the paper scraps consist of recycled paper.

11. An interior trim for transport means, in particular motor vehicles, produced by a process according to any one of the preceding claims, comprising a bearing, dimensionally stable part and a decorative part forming the visible side of the interior trim, the bearing, dimensionally stable part consisting of a plastic material of natural or recycled polyols and isocyanates which is strengthened by means of a reinforcing insert of natural fibers, the proportion of reinforcing material being between 10% and 90%, wherein the reinforcing insert consists of paper scraps.

12. An interior trim according to claim 11, characterized in that the paper scraps consist of recycled paper.

* * * * *